US012611771B2

(12) United States Patent
Kim et al.

(10) Patent No.: US 12,611,771 B2
(45) Date of Patent: Apr. 28, 2026

(54) TCP ACCELERATION LIMITATION FOR JOINT INTERPOLATED MOTIONS

(71) Applicant: FANUC AMERICA CORPORATION, Rochester Hills, MI (US)

(72) Inventors: Joonyoung Kim, Troy, MI (US); Eric Lattas, Rochester Hills, MI (US); Nivedhitha Giri, Farmington Hills, MI (US); Peter Swanson, Bloomfield Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 148 days.

(21) Appl. No.: 18/604,616

(22) Filed: Mar. 14, 2024

(65) Prior Publication Data

US 2025/0289129 A1 Sep. 18, 2025

(51) Int. Cl.
B25J 9/16 (2006.01)

(52) U.S. Cl.
CPC .................................... B25J 9/1664 (2013.01)

(58) Field of Classification Search
CPC ...................................................... B25J 9/1664
USPC ......................................................... 700/245
See application file for complete search history.

(56) References Cited

U.S. PATENT DOCUMENTS

| | | |
|---|---|---|
| 4,734,866 A | 3/1988 | Bartelt et al. |
| 5,373,221 A | 12/1994 | McGee et al. |
| 6,216,058 B1 * | 4/2001 | Hosek .................... B25J 9/1664 414/217 |
| 11,311,745 B2 * | 4/2022 | Li ......................... A61N 5/1031 |
| 2021/0122041 A1 * | 4/2021 | Mottram ............... A61B 34/30 |
| 2022/0009095 A1 * | 1/2022 | Huang .................. B25J 9/1607 |
| 2023/0158670 A1 * | 5/2023 | Lin ........................ B25J 9/1651 700/245 |

(Continued)

FOREIGN PATENT DOCUMENTS

WO 95/04316 A1 2/1995

OTHER PUBLICATIONS

ABB robotics; Technical Reference Manual, Rapid Instructions, Functions and Data Types, ABB, p. 295, 2010.

*Primary Examiner* — Kira Nguyen
(74) *Attorney, Agent, or Firm* — Shumaker, Loop & Kendrick LLP; John A. Miller

(57) ABSTRACT

A method for computing robot motion where the tool center point translational acceleration does not exceed a defined limit. Robot motion for an upcoming segment of a trajectory is computed using a known "S-curve" technique, where joint motions are calculated which move the robot from a start pose to an end pose in the shortest time given maximum joint velocity, acceleration and jerk values. Significant points on the S-curve are identified which correspond with maximum translational acceleration of the tool center point. Tool center point Cartesian motion is then calculated from the joint motions using forward kinematics. The maximum translational acceleration of the tool center point is determined and compared to the defined acceleration limit. If the maximum acceleration of the tool center point exceeds the acceleration limit, the joint motions for the trajectory segment are re-calculated using a scale factor which reduces the joint and tool center point accelerations.

20 Claims, 7 Drawing Sheets

(56) References Cited

U.S. PATENT DOCUMENTS

2023/0241763 A1 *   8/2023   Negishi ................. B25J 9/1664
700/264

* cited by examiner

110

110

120

130

Controller

140

100

For Each Joint $J_i$   $i = 1, \ldots, DOF$

600

STEP 1: Plan an s-curve in joint space

612

$T_0$

614

$T_2$  $T_1$

610

STEP 2: Determine the *significant points*

620

STEP 3: Compute $A_{max-tc}$ at the *significant points*

632

$A_{max-tc}$

636

$A_{Limit}$

634

$\frac{d}{dt} \|\dot{v}\|_t$

630

STEP 4: If $A_{max-tc} > A_{limit}$ update $T_1 = \frac{A_{max-tc}}{A_{limit}} T_1$ & *return to STEP 1* else

*terminate*

640

TCP ACCELERATION LIMITATION FOR JOINT INTERPOLATED MOTIONS

BACKGROUND

Field

The present disclosure relates generally to the field of industrial robot motion control and, more particularly, to a method for computing a joint-interpolated robot motion from a start position to a destination where the motion of a tool center point on the robot arm does not exceed a user-defined acceleration limit in Cartesian space.

Discussion of the Related Art

The use of industrial robots to perform a wide range of manufacturing, assembly and material movement operations is well known. Many of these operations and tasks are performed by articulated robots, such as five- or six-axis robots with a servo motor at each rotational joint. Control of such robots is provided in real time, where a motion program is divided into small increments of motion, and a robot controller performs real-time feedback control calculations to compute joint motor input commands which move the robot end-of-arm tool center point along a prescribed trajectory.

One common type of robotic task is material movement, which involves moving packages or workpieces from an origin location to a destination location. A particular application of this type is where the robot is fitted with a vacuum gripper tool and the robot picks up packages (e.g., boxes) one at a time and moves each package to a prescribed location. This type of robotic operation is commonly used for depalletizing or palletizing (i.e., moving boxes from a pallet to a conveyor, or vice versa).

In operations of the type described above, it is possible for a package to detach from the vacuum gripper during the movement by the robot. Dropped packages are quite detrimental to the productivity of a package moving operation. For one thing, the dropped package and its contents may be damaged upon impact. Also, the dropped package must be handled manually—which involves stopping the robot, picking up the dropped package by an operator, inspecting the package and manually placing it in the intended destination. Other adverse consequences of a dropped package may also be experienced—such as disruption to the flow and sequence of packages on a conveyor which is operating in cooperation with the robot. For all of these reasons, dropped packages are extremely undesirable.

One of the reasons a package may be dropped by a robot with a vacuum gripper tool is that the acceleration of the package by the robot creates a force which exceeds the capability of the vacuum gripper. One solution to this problem would be to simply slow down the entire robot motion so that high velocities and high accelerations are not experienced by the packages. However, for productivity reasons, it is advantageous to operate the robot as fast as possible without exceeding the force-generating capability of the vacuum gripper tool.

When a robot task involves moving a tool center point from one location to another along an arbitrary path, the fastest and most efficient mode of robot operation is known as joint interpolated motion. When the robot operates using joint interpolated motion, the robot joints are subject to mechanical constraints such as maximum rotational velocities and accelerations, but the motion of the tool center point along the path is simply the result of the joint motions, and tool center point accelerations are unpredictable. Using current robot programming techniques, it is therefore not known if the tool center point acceleration might be great enough to cause a dropped package.

In light of the circumstances described above, there is a need for a method of applying a user-defined tool center point acceleration limit to a robot operating in joint interpolated motion mode.

SUMMARY

The present disclosure describes a method and system for computing a robot motion where the translational acceleration of a tool center point on the robot arm does not exceed a user-defined acceleration limit in Cartesian space. For a robot operating in joint interpolated motion mode, a limit for the maximum translational acceleration of the tool center point is defined to the robot controller. Robot motion for an upcoming segment of a trajectory is computed using a known "S-curve" technique, where joint motions are calculated which move the robot from a start pose to an end pose in the shortest possible time given mechanical constraints including maximum joint velocity, acceleration and jerk values. Significant points on the S-curve are identified which correspond with maximum translational acceleration of the tool center point. Tool center point Cartesian motion is then calculated from the joint motions using forward kinematics. The calculated translational acceleration of the tool center point at the significant points is determined and compared to the user-defined acceleration limit. If the calculated acceleration of the tool center point exceeds the user-defined acceleration limit, the joint motions for the trajectory segment are re-calculated using a scale factor which reduces the joint and tool center point accelerations.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to tool center point acceleration limitation for joint interpolated robot motions is merely exemplary in nature, and is in no way intended to limit the disclosed devices and techniques or their applications or uses.

Industrial robots are used for a variety of manufacturing, assembly and material movement operations. In one type of application, a robot is used to move a workpiece or a package from one location to another. A particular example of robotic package movement is known as depalletizing—where boxes are removed from a stack on a pallet, one at a time, and each box is moved to a destination location such as a conveyor. The reverse operation—picking boxes from a conveyor and placing each box in a particular location on a pallet—is also commonly employed.

Figure 1:
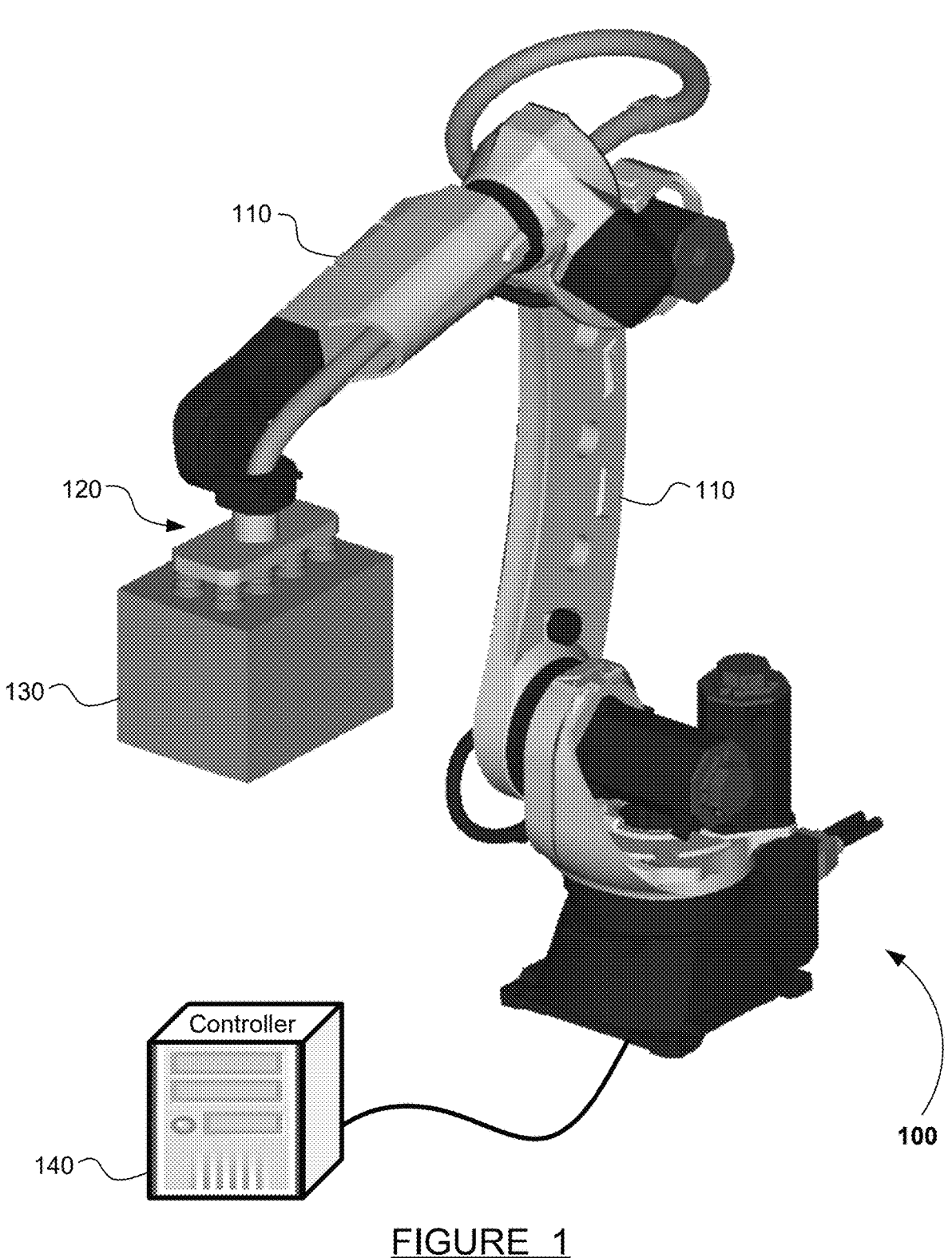
FIG. 1 is an illustration of an industrial robot fitted with a vacuum gripper tool, with a package attached to the vacuum gripper and being moved by the robot, as an example of an application which can benefit from the techniques of the present disclosure.

FIG. 1 is an illustration of an industrial robot 100 fitted with a vacuum gripper 120, with a package 130 attached to the vacuum gripper 120 and being moved by the robot 100, as an example of an application which can benefit from the techniques of the present disclosure. The robot 100 includes an articulated robot arm with multiple links 110, where the links 110 are coupled together at rotational joints which are actuated by servo motors, as known by those skilled in the art. The vacuum gripper 120 is the tool being used by the robot 100, where the vacuum gripper 120 is coupled to an outer arm link or wrist joint of the robot 100. The vacuum gripper 120 is a commonly used tool when the package 130 is a box, as illustrated in FIG. 1.

The robot 100 is in communication with a controller 140 in a manner known in the art—where the controller 140 provides joint motion commands to the robot 100, causing the robot 100 to move the vacuum gripper 120 to a target location where the package 130 is grasped, followed by motion commands causing the robot 100 to move the gripper 120 to a destination location where the package 130 is placed and released.

Figure 2:
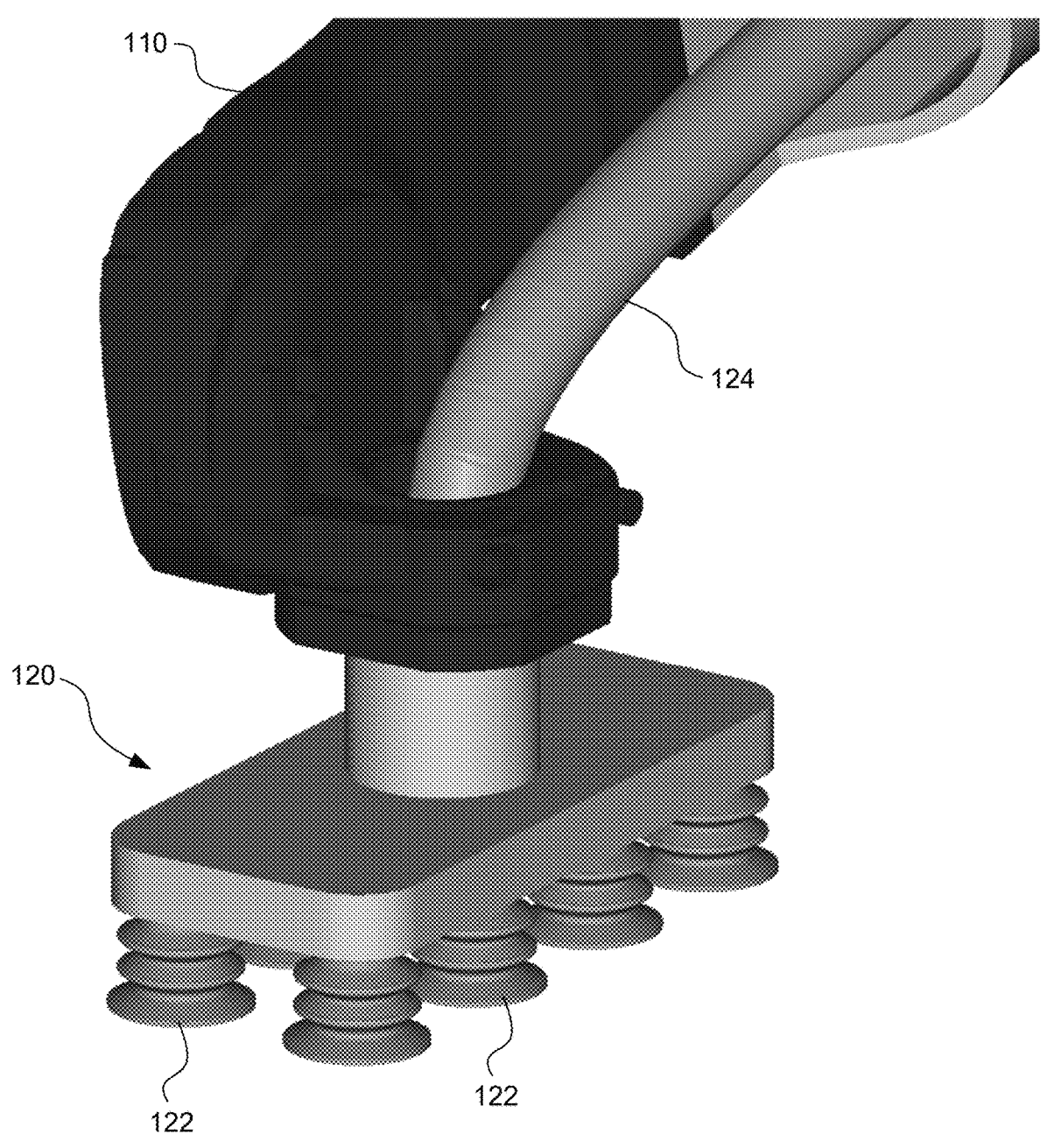
FIG. 2 is an illustration of an outer arm of the industrial robot of FIG. 1 with the vacuum gripper, showing an arrangement of vacuum cups which are used to grasp the package.

FIG. 2 is an illustration of an outer arm link 110 of the industrial robot 100 of FIG. 1 with the vacuum gripper 120, showing an arrangement of vacuum cups 122 which are used to grasp the package 130. When the gripper 120 arrives at the target location and the cups 122 are pressed against the package 130, a vacuum is drawn in a vacuum tube 124, whereupon the cups 122 grasp the package 130 with a vacuum or suction force. When the gripper 120 arrives at the destination location, the vacuum is eliminated, and the cups 122 release the package 130. The gripper 120 is shown with eight of the vacuum cups 122 (a two by four grid, some of which are not visible in FIG. 2). Other gripper designs—having more or fewer than eight of the cups 122—are also known and used in the same fashion as needed to suit a particular application.

While FIGS. 1 and 2 illustrate known robot and gripper configurations and a common application, existing robot control techniques lack the capability to limit the acceleration of the vacuum gripper 120 as it moves through its trajectory. If the acceleration of the gripper 120 is too high, the gripper 120 may not be able to maintain its grasp on the package 130, resulting in a dropped package—which is highly undesirable. The techniques of the present disclosure have been developed to address and solve this problem.

Figure 3:
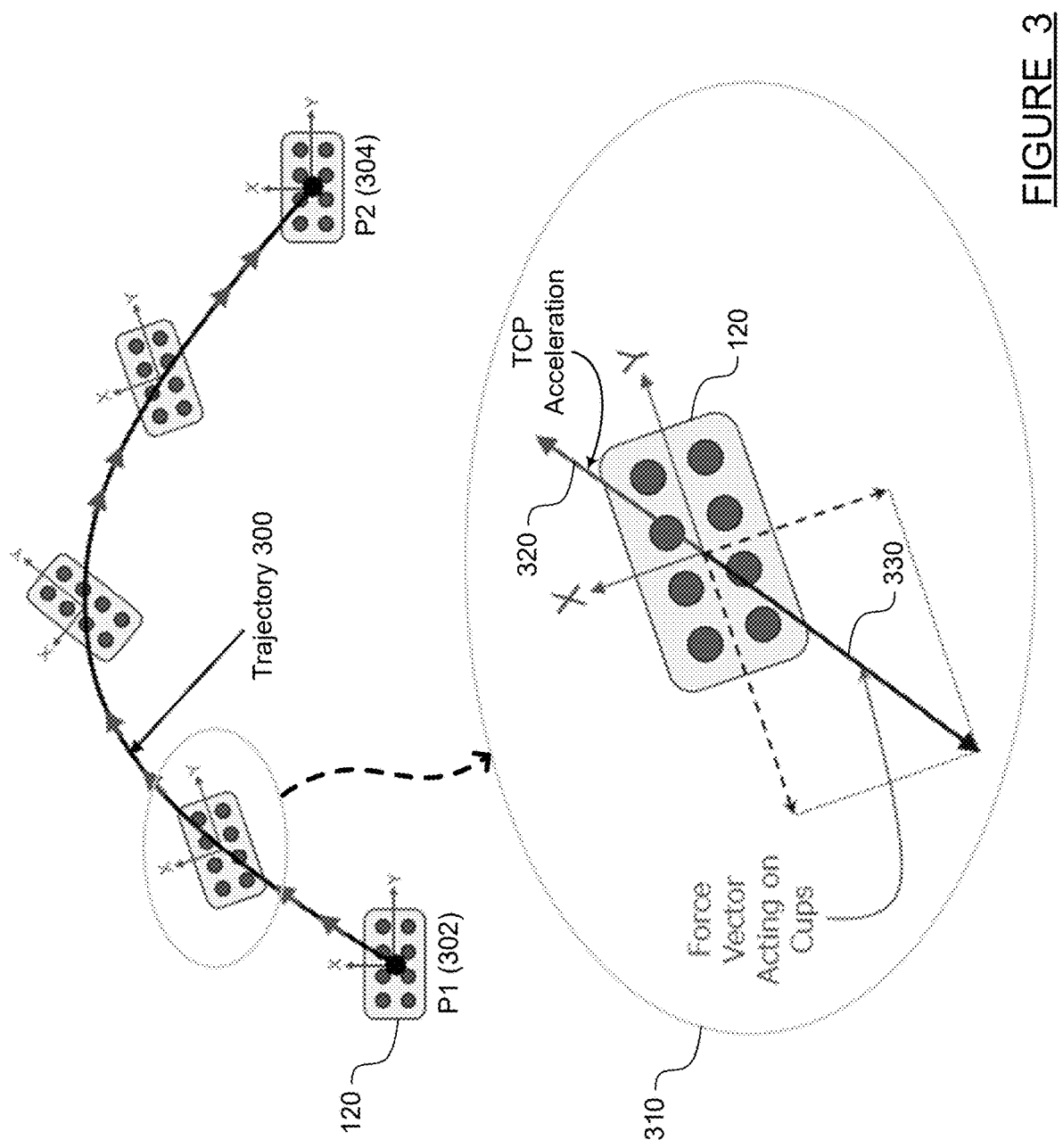
FIG. 3 is an illustration of a vacuum gripper moving through Cartesian space along a joint interpolated motion trajectory, and also showing the forces acting on the cups of the vacuum gripper as a result of tool center point acceleration.

FIG. 3 is an illustration of a vacuum gripper moving through Cartesian space along a joint interpolated motion trajectory, and also showing the forces acting on the cups of the vacuum gripper as a result of tool center point acceleration. The vacuum gripper 120 is shown in several positions and orientations along a trajectory 300. The trajectory is calculated to move the gripper 120 from a first point P1 (302) to a second point P2 (304) using joint interpolated motion. As discussed earlier, joint interpolated motion calculates synchronized simultaneous joint motions which move the tool center point from P1 to P2 in the shortest possible time given robot mechanical constraints (i.e., maximum values of joint rotational velocity, acceleration and jerk). The orientation of the gripper 120 changes as it moves along the trajectory 300, as the joint interpolated motion technique simply calculates synchronized rotations of all of the robot joints (e.g., six joints for a six-axis robot) to reach the target position P2, and there is no constraint on mid-trajectory gripper/tool orientation in joint interpolated motion.

The overall tool center point motion from P1 to P2 defined by the trajectory 300 may be divided into multiple segments, as indicated by the arrowheads along the length of the trajectory 300. A close-up of the gripper 120 from one of the segments of the trajectory 300 is shown in an inset 310. X and Y axes of a tool center coordinate frame are shown, where the origin of the tool center coordinate frame is the tool center point. The translational acceleration of the tool center point at the current location along the trajectory 300 is indicated by an arrow 320. A corresponding reaction force of the package 130 on the cups 122 of the gripper 120 is indicated by an arrow 330. The reaction force may be calculated simply using F=ma, where F is the reaction force, m is the mass of the package 130 and a is the acceleration of the tool center point.

As discussed earlier, if the acceleration of the tool center point at any point in the trajectory 300 causes a reaction force which exceeds the grasping capability of the gripper 120, the package 130 is likely to detach from the gripper 120, which is a very undesirable situation. Therefore, according to the techniques of the present disclosure, for each upcoming segment of a trajectory, a maximum translational acceleration of the tool center point is calculated, and if the maximum calculated acceleration exceeds the prescribed acceleration limit, the trajectory segment is re-calculated using a scale factor to reduce the maximum acceleration. This technique is described in detail below.

Figure 4:
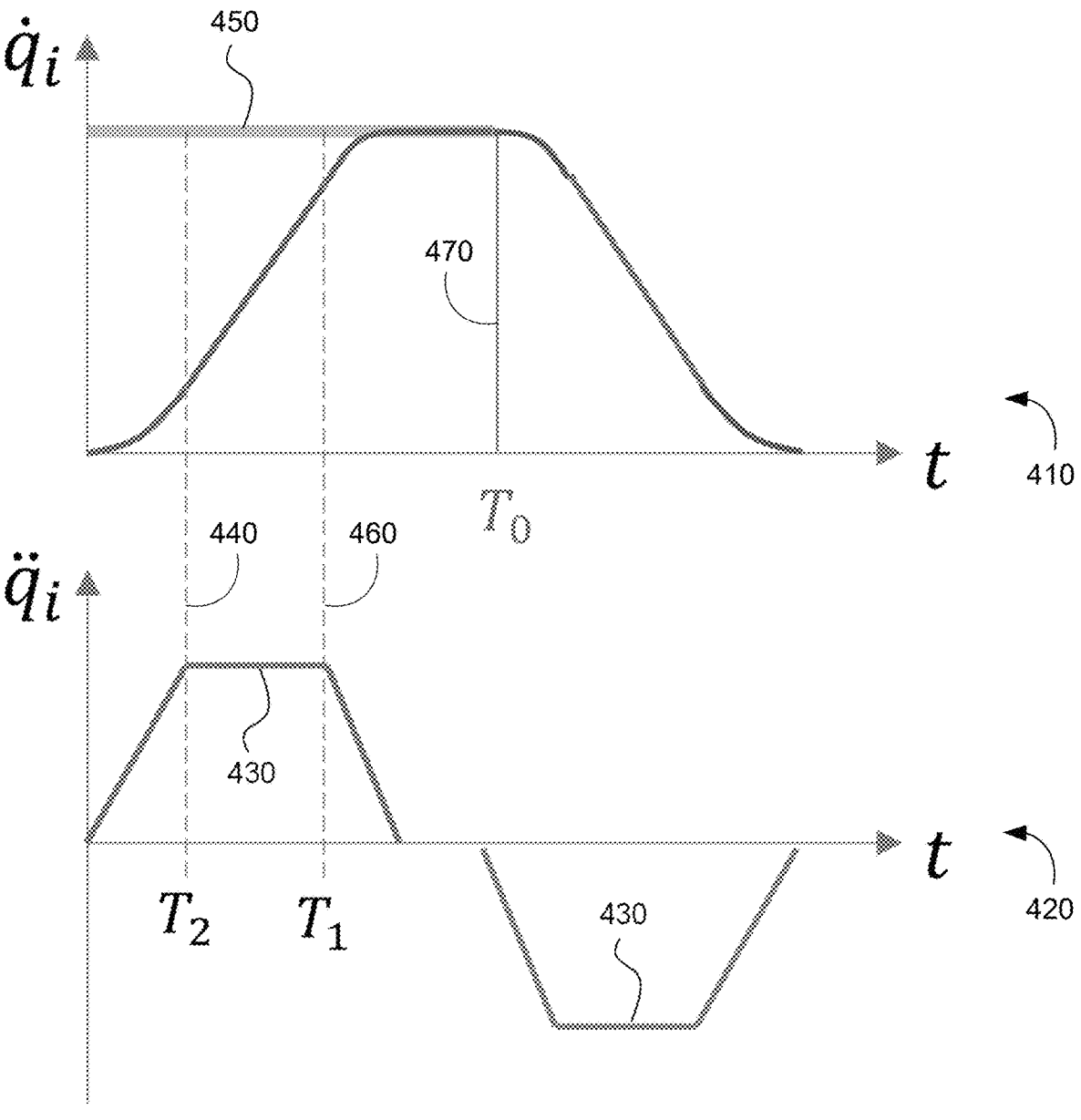
FIG. 4 includes graphs of robot joint velocity and acceleration versus time, illustrating key concepts involved in computing an S-curve motion profile in joint interpolated motion mode.

FIG. 4 includes graphs of robot joint velocity and acceleration versus time, illustrating key concepts involved in computing an S-curve motion profile in joint interpolated motion mode. A graph 410 plots the rotational velocity versus time for a particular joint in the robot, and a graph 420 plots the rotational acceleration versus time for the same joint.

Beginning at time t=0 at the beginning of a trajectory segment, the joint acceleration ramps up at maximum allowable jerk (a robot mechanical constraint) until the joint acceleration reaches a maximum allowable acceleration constraint. The maximum allowable acceleration is indicated by a line 430 on the acceleration graph 420. The time it takes for the joint to reach maximum acceleration is known as $T_2$, and is shown by a vertical dashed line indicated at 440. The joint then continues accelerating at maximum acceleration until it approaches maximum allowable velocity, at which point the acceleration ramps back down at maximum jerk to reach zero acceleration just as the joint reaches maximum velocity. The maximum allowable velocity is indicated by a line 450 on the velocity graph 410. The time it takes for the joint to reach the end of maximum acceleration is known as $T_1$, and is shown by a vertical dashed line indicated at 460. The joint then continues at maximum velocity for a certain amount of time (determined as discussed below), before deceleration begins.

It can be observed from the acceleration graph 420 that the S-curve motion profile for a trajectory segment contains seven phases; this includes three acceleration phases (maximum jerk until $T_2$, maximum acceleration until $T_1$, and maximum negative jerk until reaching zero acceleration), a constant velocity phase in the middle, and three deceleration phases which are symmetrically opposite the acceleration phases.

The maximum allowable joint velocity, acceleration and jerk values are robot mechanical constraints which are known to the robot controller for any given robot architecture. Therefore, default values of $T_1$ and $T_2$ are also known by the controller, as they can be calculated from the mechanical constraints. However, the amount of distance to be traveled by a joint during a trajectory segment also affects the calculation of the S-curve motions. A time $T_0$, indicated by a vertical line indicated at 470, is defined as the distance to be traveled by the joint during a trajectory segment divided by the maximum joint velocity. That is, $T_0$=dist/$V_{max}$.

Depending on the relationships between $T_0$, $T_1$ and $T_2$, there are six different scenarios or cases to consider for the computation of the S-curve motion profile. FIG. 4 shows one scenario or case—where the time $T_0$ is greater than the sum of $T_1$ and $T_2$. In this case, there is enough time and joint travel distance to allow the joint acceleration to reach $A_{max}$ and continue at $A_{max}$ before the joint velocity levels off at $V_{max}$, with deceleration beginning after some time at $V_{max}$. In other cases, the joint accelerates and decelerates without ever reaching $V_{max}$ and/or $A_{max}$. Depending on which case is applicable, which is determined from the relationships between $T_0$, $T_1$ and $T_2$, a recursive equation formulation is known which can be used to calculate the time duration of all seven phases, along with the resulting joint positions, velocities, accelerations and jerks for all of the phases of the trajectory segment. A complete discussion of the six different cases of S-curve motion profiles and the corresponding calculation of the seven phases of jerk-bound motion can be found in the technical paper titled *On Algorithms for Planning S-curve Motion Profiles*, by Kim D. Nguyen et al., *International Journal of Advanced Robotic Systems* (2008), which is herein incorporated by reference.

For each trajectory segment, the S-curve motion profile is computed as described above for each joint $J_i$ in the robot, where i=1, . . . , DOF (e.g., i=6 for a six-axis robot). The motion of the joints is synchronized such that all of the joints reach the desired position at the end of the trajectory segment at the same time.

The S-curve motion profile computation described above provides a joint interpolated motion solution which moves the tool center point from a start location to a destination location in the shortest possible time given robot mechanical constraints ($V_{max}$, $A_{max}$ and $J_{max}$). However, the translational acceleration of the tool center point can only be determined after the S-curve motion profile computation is performed, as discussed below.

Figure 5:
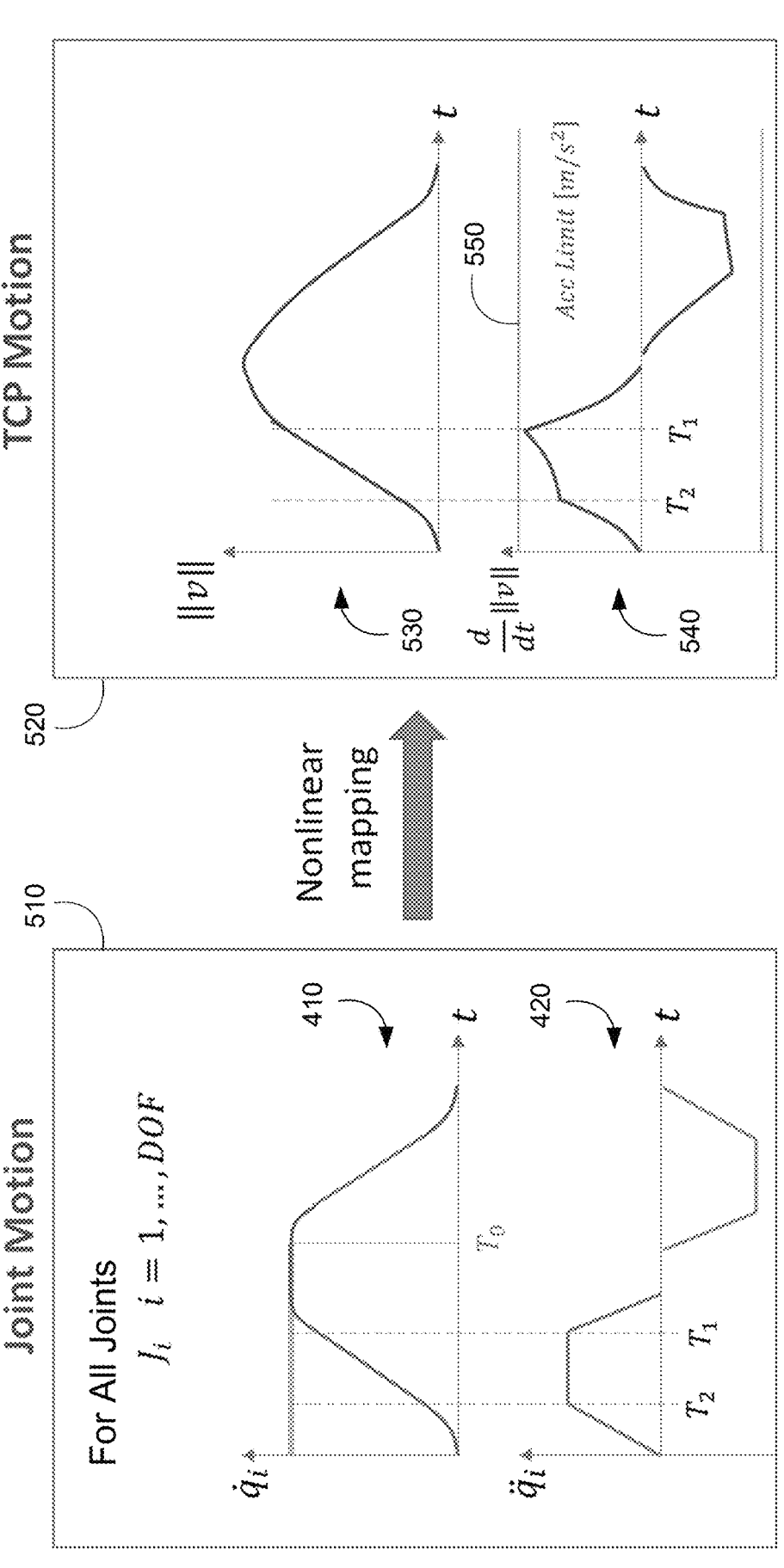
FIG. 5 includes the graphs of robot joint velocity and acceleration of FIG. 4 along with corresponding graphs of tool center point velocity and acceleration used for comparison to an acceleration limit, according to an embodiment of the present disclosure.

FIG. 5 includes the graphs of robot joint velocity and acceleration of FIG. 4 along with corresponding graphs of tool center point velocity and acceleration used for comparison to an acceleration limit, according to an embodiment of the present disclosure. Box 510 contains the joint velocity graph 410 and the joint acceleration graph 420 from FIG. 4. With the S-curve motion profile for a trajectory segment computed for all robot joints, the motion of the tool center point may be calculated, with the results shown in box 520. The transformation from joint motions to tool center point motion in Cartesian space is highly nonlinear, but may be calculated in a straightforward manner using forward kinematics when given robot geometry, as known to those skilled in the art.

Based on robot joint motion profiles and robot geometry, the motion of the tool center point defines a velocity vector through Cartesian space (i.e., the X/Y/Z components of velocity in a fixed coordinate frame). The magnitude or norm of the tool center point velocity vector is plotted versus time for a trajectory segment on a graph 530. It can be observed that the maximum tool center point velocity occurs during the maximum joint velocity phase of the S-curve joint motion profile, which intuitively makes sense.

The time derivative of the magnitude of the velocity vector is plotted versus time on a graph 540. The time derivative of velocity is acceleration; thus, the graph 540 plots tool center point acceleration versus time for the trajectory segment. The joint acceleration graph 420 (at left) may be described as being piecewise linear and monotonic. That is, each phase of joint motion has a linear acceleration profile, and each phase exhibits only an increase or decrease in acceleration (or no change). The tool center point acceleration graph 540 (at right), however, is quite nonlinear but is still monotonic in each phase. This observation, which is true for most robot motions, allows for significant points of maximum acceleration to be readily identified on the tool center point acceleration graph 540. One of the significant points of maximum acceleration occurs at the time $T_1$. The computed value of tool center point acceleration at this point may be compared to the prescribed acceleration limit, which is indicated by a line 550. Another acceleration extreme—the maximum negative acceleration—occurs later in the trajectory, and can also be compared to the acceleration limit. These evaluations are discussed further below.

Figure 6:
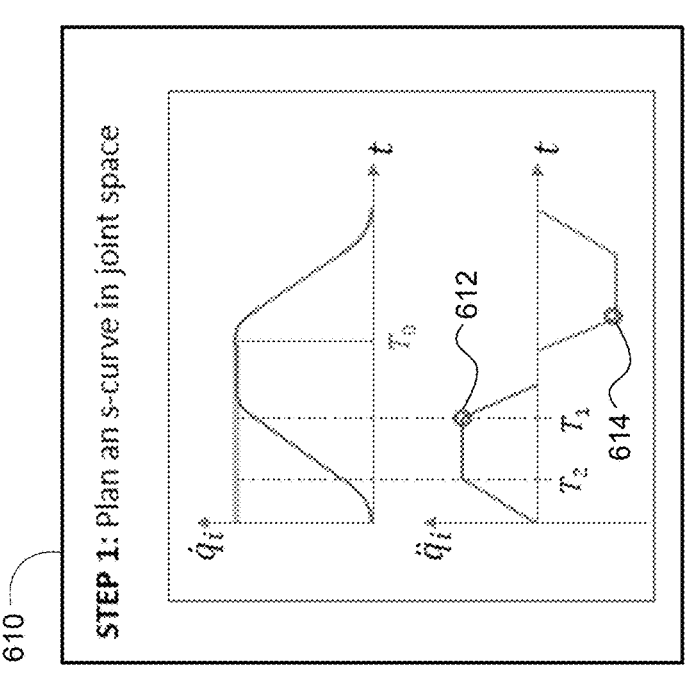
FIG. 6 is an illustrated block diagram of a technique for applying a tool center point acceleration limit for joint interpolated robot motions, according to an embodiment of the present disclosure.
Figure 6:
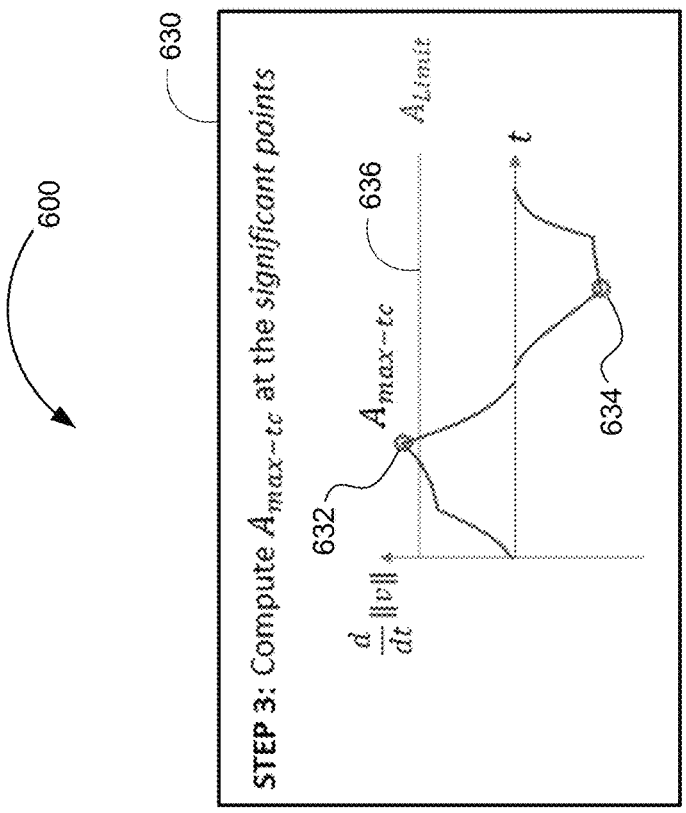

FIG. 6 is an illustrated block diagram 600 of a technique for applying a tool center point acceleration limit for joint interpolated robot motions, according to an embodiment of the present disclosure. At Step 1 in block 610, an S-curve motion profile is computed in joint space, as discussed earlier. Input information required to compute the S-curve motion profile includes initial and final positions for the motion, along with robot mechanical constraints, as discussed earlier. The initial and final positions may be for a complete trajectory or a trajectory segment. Because the robot is operating in joint interpolated motion mode, the initial and final positions are preferably in joint space (e.g., for a six-axis robot, a vector $q_0$ defining all six initial joint positions, and a vector $q_f$ defining all six final joint positions). Joint positions may of course be computed from initial and final tool center point positions using inverse kinematics.

The robot mechanical constraints, as discussed earlier, include $V_{max}$, $A_{max}$ and $J_{max}$. Based on the known robot mechanical constraints, default values of $T_1$ and $T_2$ may be computed as discussed earlier, and are therefore known by the robot controller. In addition, based on the distance to be traveled during the trajectory segment (from $q_0$ to $q_f$) and the maximum joint velocity $V_{max}$, the value of $T_1$ may be computed for the S-curve motion profile being computed.

The computation of the S-curve motion profile at the block 610 is performed as discussed earlier—where the relationships between the values of $T_0$, $T_1$ and $T_2$ are evaluated and used to determine which one of the six cases of jerk-bound motion applies, and then a set of equations is recursively computed to provide a complete solution for the seven-phase S-curve motion profile. The S-curve motion profile solution includes the time durations for each of the seven phases, along with the displacement, velocity, acceleration and jerk profiles in each phase.

At Step 2 in block 620, the significant points on the S-curve motion profile are identified, where the significant points indicate points of expected maximum tool center point Cartesian acceleration. As discuss earlier, for most types of robot motion, the end of phase two of the seven-phase motion profile is one significant point. This is identified as point 612 on the acceleration graph in the box 610. The significant point 612 occurs at the time $T_1$, which is at the end of the constant acceleration phase of robot joint motion, at which time the positive acceleration of the tool center point is typically greatest. In addition, for most types of robot motion, the end of phase five of the seven-phase motion profile is another significant point. This is identified as point 614 on the acceleration graph in the box 610. The significant point 614 occurs at the end of the maximum negative jerk phase leading to maximum negative acceleration of robot joint motion, at which time the deceleration (negative acceleration) of the tool center point is typically greatest.

At Step 3 in block 630, the tool center point acceleration versus time is calculated from the S-curve joint motion profile, and the maximum absolute values of tool center point acceleration ($A_{max-tc}$) at the significant points are computed. With the time values of the significant points determined from Step 2 in the block 620, the tool center point acceleration can simply be calculated at those two values of time and labeled as the points of maximum absolute value of tool center point acceleration ($A_{max-tc}$), as indicated by points 632 and 634 in the block 630. Alternately, maximum absolute values of tool center point acceleration can be identified using other techniques, such as analyzing the tool center point acceleration versus time data for the entire trajectory to identify the maximum and minimum values. The defined tool center point acceleration limit ($A_{limit}$) is shown by a line 636 in the block 630. The value of $A_{limit}$ may be user-defined, or may be automatically defined by an algorithm which computes the acceleration limit from robot job parameter data (e.g., weight or mass of package to be moved, and amount of vacuum force which can be developed by the vacuum gripper, using the equation F=ma, solving for a, and setting $A_{limit}$=a as discussed earlier).

At Step 4 in block 640, it is determined whether the maximum absolute value of tool center point acceleration ($A_{max-tc}$) is greater than the defined tool center point acceleration limit ($A_{limit}$). If so, then a scale factor $\lambda$ is calculated as $\lambda=A_{max-tc}/A_{limit}$, and a new value of $T_1$ (to replace the previously-used default value of $T_1$) is calculated as $T_1=\lambda T_1$.

With the new value of $T_1$, the algorithm depicted by the block diagram 600 returns to Step 1 to re-compute the S-curve motion profile in joint space, and the maximum tool center point acceleration ($A_{max-tc}$) is again computed using Steps 2 and 3. When $A_{max-tc}$ does not exceed $A_{limit}$, the algorithm terminates and the S-curve joint motion profile is used to control the robot to perform the package movement according to the computed trajectory or segment.

It will be noted that the value of $\lambda$ is greater than one (because $A_{max-tc}>A_{limit}$ when $\lambda$ is computed), which means that the new value of $T_1$ will be greater than the previous value of $T_1$. The reason that $T_1$ is scaled up to a larger value in this algorithm is that this will reduce robot accelerations. Referring back to FIG. 4 and the discussion of the S-curve joint motion profile computation—the maximum joint acceleration is found to be inversely proportional to $T_1$. This is true for all of the six cases of relationships between $T_0$, $T_1$ and $T_2$. Thus, a larger value of $T_1$ will result in a smaller maximum joint acceleration. Although a smaller maximum joint acceleration does not guarantee a proportionally smaller maximum tool center point acceleration, there is generally a positive correlation; that is, an increase in $T_1$ will have the desired effect of reducing $A_{max-tc}$. The algorithm depicted by the block diagram 600 is repeated until $A_{max-tc}\leq A_{limit}$. It has been found in analyzing a variety of different robotic package movement applications that two passes through the algorithm is generally sufficient to achieve the desired result of the maximum tool center point acceleration being less than the prescribed tool center point acceleration limit.

The algorithm depicted by the block diagram 600 is preferably implemented in a motion planner module of a robot controller architecture. That is, the tool center point acceleration limitation computations of FIG. 6 are performed in cooperation with a joint motion plan calculation routine—after the basic parameters of a task are determined (e.g., beginning and ending points), and before movement execution commands are sent by the controller to the joints of the robot.

Figure 7:
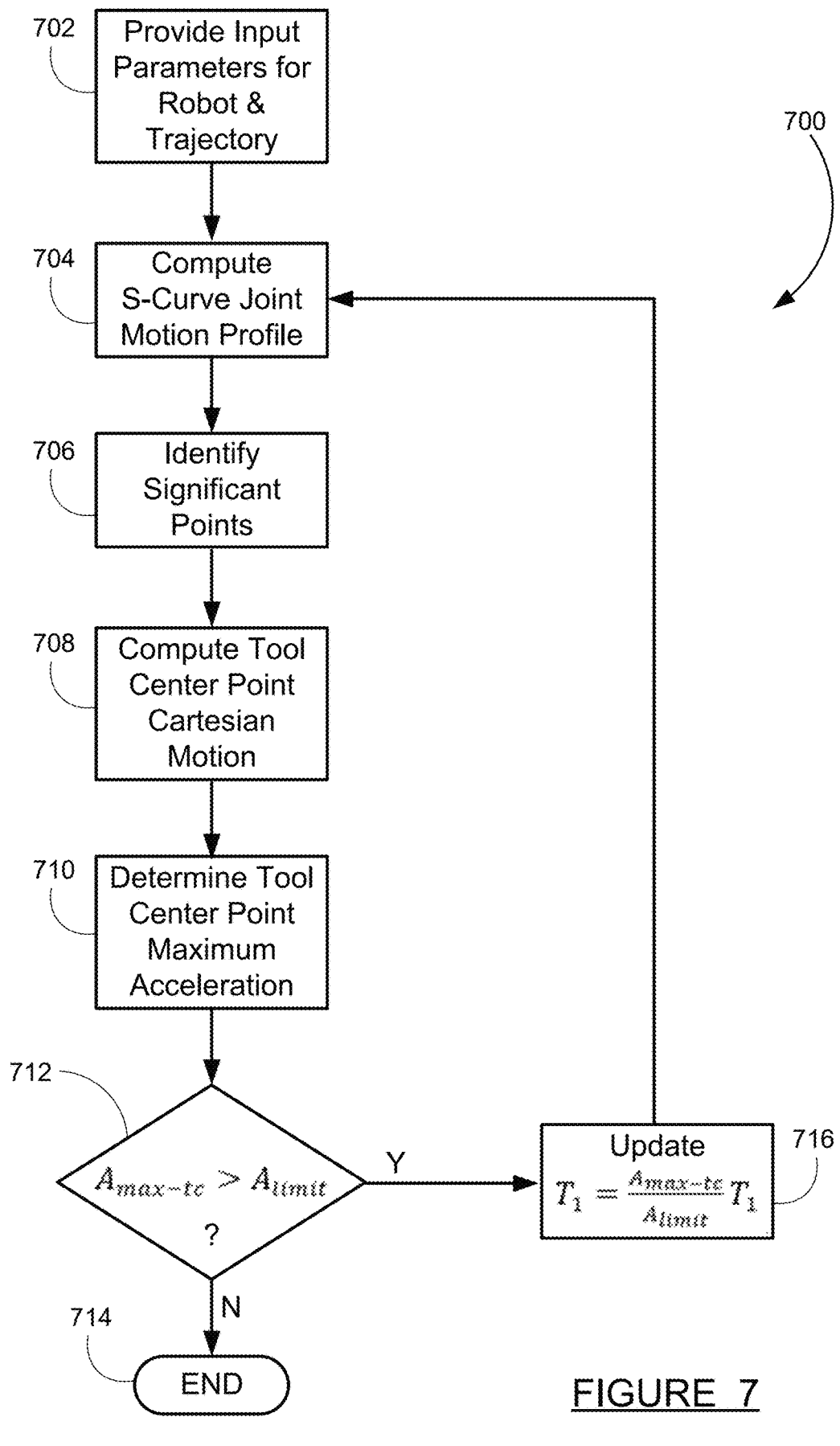
FIG. 7 is a flowchart diagram of a method for applying a tool center point acceleration limit for joint interpolated robot motions, according to an embodiment of the present disclosure.

FIG. 7 is a flowchart diagram 700 of a method for applying a tool center point acceleration limit for joint interpolated robot motions, according to an embodiment of the present disclosure. At box 702, input parameters for a trajectory or trajectory segment are provided, along with robot constraint parameters. The input parameters include the trajectory starting and ending positions ($q_0$ and $q_f$ in joint space; or tool center point coordinates in a workspace coordinate frame, which may be converted to $q_0$ and $q_f$), along with robot mechanical constraints, including $V_{max}$, $A_{max}$ and $J_{max}$. From the robot mechanical constraints, default values of $T_1$ and $T_2$ are known, and based on the distance to be traveled (from $q_0$ to $q_f$) and the maximum joint velocity $V_{max}$, the value of $T_0$ may be computed. The tool center point acceleration limit $A_{limit}$ (e.g., in meters per second squared) is also provided at the box 702.

At box 704, an S-curve joint motion profile is computed as discussed earlier. This includes determining which of the six cases of motion profile applies based on the relationships between the values of $T_0$, $T_1$ and $T_2$, and using the applicable set of equations and boundary conditions to calculate the S-curve motion profile. At box 706, the significant points are identified on the joint acceleration profile, including identifying one significant point at the end of the second phase and one at the end of the fifth phase of the seven phase motion profile described earlier.

At box 708, tool center point Cartesian motion in workspace or "world" coordinates is computed from the joint motion profile using forward kinematics calculations based on known robot geometry. This includes computing the tool center point velocity vector through Cartesian space based on the joint motions, calculating the magnitude of the velocity vector over the time duration of the trajectory, and calculating the tool center point acceleration as the time rate of changes of the velocity magnitude. At box 710, maximum absolute values of tool center point acceleration at the significant points are determined, as explained earlier. At decision diamond 712, it is determined whether the largest absolute value of tool center point acceleration ($A_{max-tc}$) is greater than the tool center point acceleration limit ($A_{limit}$). If not, the process ends at terminus 714, whereupon the computed S-curve joint motion profile is used to control robot motion for the trajectory or trajectory segment.

If, at the decision diamond 712, the largest absolute value of tool center point acceleration ($A_{max-tc}$) is greater than the tool center point acceleration limit ($A_{limit}$), a scale factor $\lambda$ is calculated as $\lambda = A_{max-tc}/A_{limit}$, and a new value of $T_1$ is calculated as $T_1 = \lambda T_1$. Using the new value of $T_1$, the process returns to the box 704 to re-compute the S-curve joint motion profile. This looping continues until $A_{max-tc}$ is less than or equal to $A_{limit}$; this criteria is normally met after about two iterations. When the criteria is met, the computed S-curve joint motion profile will produce tool center point accelerations which do not exceed the prescribed tool center point acceleration limit, thus ensuring that the vacuum gripper will maintain its grasp on the package which it is moving.

Throughout the preceding discussion, various computers and controllers are described and implied. It is to be understood that the software applications and modules of these computers and controllers are executed on one or more electronic computing devices having a processor and a memory module. In particular, this includes one or more processors in the robot controller 140 discussed above. Specifically, the processors in the controller 140 are configured to perform the tool center point acceleration limitation calculation described above.

While a number of exemplary aspects and embodiments of the methods and systems for tool center point acceleration limitation for joint interpolated robot motions have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for tool center point acceleration limitation in a multi-axis robot, said method comprising:

computing, by a computing device, a robot joint motion profile for a trajectory, including computing joint motions for a time duration of the trajectory for all joints in the multi-axis robot;

calculating tool center point velocity and acceleration in Cartesian space for the time duration of the trajectory, based on the robot joint motion profile and robot geometry;

determining a maximum absolute value of tool center point acceleration during the trajectory; and when the maximum absolute value of tool center point acceleration exceeds a pre-defined tool center point acceleration limit, calculating a scale factor and re-computing the robot joint motion profile for the trajectory using a time constant which is increased by the scale factor; and when the maximum absolute value of tool center point acceleration does not exceed the tool center point acceleration limit, controlling the robot to move a tool center point through the trajectory.

2. The method according to claim 1 wherein computing the robot joint motion profile for the trajectory includes computing joint motions causing the robot to move through the trajectory from a start position to an end position.

3. The method according to claim 2 wherein computing the robot joint motion profile for the trajectory includes computing an S-curve joint motion profile, where the S-curve joint motion profile includes seven phases of motion over the time duration of the trajectory, and the seven phases of motion are computed using inputs including robot mechanical constraints and the start position and the end position.

4. The method according to claim 3 wherein the robot mechanical constraints include robot joint maximum velocity, robot joint maximum acceleration and robot joint maximum jerk.

5. The method according to claim 1 wherein calculating tool center point velocity in Cartesian space includes using forward kinematics to calculate tool center point velocity for the time duration of the trajectory based on the robot joint motion profile and robot geometry.

6. The method according to claim 5 wherein calculating tool center point acceleration in Cartesian space includes calculating a time rate of change of a magnitude of the tool center point velocity for the time duration of the trajectory.

7. The method according to claim 1 wherein determining a maximum absolute value of tool center point acceleration includes evaluating the tool center point acceleration at two significant points in time which are identified from the robot joint motion profile.

8. The method according to claim 7 wherein a first of the significant points is at a time corresponding with an end of a maximum positive joint acceleration phase of the robot joint motion profile, and a second of the significant points is at a time corresponding with a beginning of a maximum negative joint acceleration phase of the robot joint motion profile.

9. The method according to claim 1 wherein the scale factor is a ratio of the maximum absolute value of tool center point acceleration to the tool center point acceleration limit, and the time constant is a time to reach an end of a maximum positive joint acceleration phase of the robot joint motion profile.

10. The method according to claim 1 wherein the pre-defined tool center point acceleration limit is defined by a user in a programming command, or the pre-defined tool center point acceleration limit is calculated by the computing device based on a mass of a package to be moved by a vacuum gripper fitted to the robot, along with a grasping force applied to the package by the vacuum gripper.

11. The method according to claim 1 wherein the computing device is a robot controller which provides joint motion commands to move the tool center point through the trajectory.

12. A method for tool center point acceleration limitation in a multi-axis robot, said method comprising:

providing input parameters including robot joint mechanical constraints, start and end positions for a trajectory, and a tool center point acceleration limit;

computing, by a robot controller, a robot S-curve joint motion profile for the trajectory using the input parameters, including computing joint motions for a time duration of the trajectory for all joints in the multi-axis robot;

calculating tool center point velocity and acceleration in Cartesian space for the time duration of the trajectory, based on the S-curve joint motion profile and robot geometry;

determining a maximum absolute value of tool center point acceleration during the trajectory; and when the maximum absolute value of tool center point acceleration exceeds the tool center point acceleration limit, calculating a scale factor as a ratio of the maximum absolute value of tool center point acceleration to the tool center point acceleration limit, and re-computing the S-curve joint motion profile for the trajectory using a time constant which is increased by the scale factor, where the time constant is a time to reach an end of a maximum positive joint acceleration phase of the S-curve joint motion profile.

13. The method according to claim 12 wherein the S-curve joint motion profile includes seven phases of motion over the time duration of the trajectory, and wherein the robot mechanical constraints include robot joint maximum velocity, robot joint maximum acceleration and robot joint maximum jerk.

14. The method according to claim 12 wherein calculating tool center point velocity in Cartesian space includes using forward kinematics to calculate tool center point velocity for the time duration of the trajectory based on the S-curve joint motion profile and robot geometry, and wherein calculating tool center point acceleration in Cartesian space includes calculating a time rate of change of a magnitude of the tool center point velocity for the time duration of the trajectory.

15. An industrial robot system with tool center point acceleration limitation, said system comprising:

a multi-axis robot; and a controller, having a processor and memory, in communication with the robot, where the controller is configured with a tool center point acceleration limitation algorithm performing steps including;

computing a robot joint motion profile for a trajectory, including computing joint motions for a time duration of the trajectory for all joints in the multi-axis robot;

calculating tool center point velocity and acceleration in Cartesian space for the time duration of the trajectory, based on the robot joint motion profile and robot geometry;

determining a maximum absolute value of tool center point acceleration during the trajectory;

when the maximum absolute value of tool center point acceleration exceeds a pre-defined tool center point acceleration limit, calculating a scale factor and re-computing the robot joint motion profile for the trajectory using a time constant which is increased by the scale factor; and controlling the multi-axis robot to move a tool center point through the trajectory.

16. The system according to claim 15 wherein computing the robot joint motion profile for the trajectory includes computing an S-curve joint motion profile causing the robot to move through the trajectory from a start position to an end position, where the S-curve joint motion profile includes seven phases of motion over the time duration of the trajectory, and the seven phases of motion are computed using inputs including robot mechanical constraints and the start position and the end position, and where the robot mechanical constraints include robot joint maximum velocity, robot joint maximum acceleration and robot joint maximum jerk.

17. The system according to claim 15 wherein calculating tool center point velocity in Cartesian space includes using forward kinematics to calculate tool center point velocity for the time duration of the trajectory based on the robot joint motion profile and robot geometry, and wherein calculating tool center point acceleration in Cartesian space includes calculating a time rate of change of a magnitude of the tool center point velocity for the time duration of the trajectory.

18. The system according to claim 15 wherein determining a maximum absolute value of tool center point acceleration includes evaluating the tool center point acceleration at two significant points in time which are identified from the robot joint motion profile, where a first of the significant points is at a time corresponding with an end of a maximum positive joint acceleration phase of the robot joint motion profile, and a second of the significant points is at a time corresponding with a beginning of a maximum negative joint acceleration phase of the robot joint motion profile.

19. The system according to claim 15 wherein the scale factor is a ratio of the maximum absolute value of tool center point acceleration to the tool center point acceleration limit, and the time constant is a time to reach an end of a maximum positive joint acceleration phase of the robot joint motion profile.

20. The system according to claim 15 wherein the pre-defined tool center point acceleration limit is defined by a user in a programming command, or the pre-defined tool center point acceleration limit is calculated by the controller based on a mass of a package to be moved by a vacuum gripper fitted to the robot, along with a grasping force applied to the package by the vacuum gripper.

* * * * *